(12) United States Patent
Fujita et al.

(10) Patent No.: US 11,919,442 B2
(45) Date of Patent: Mar. 5, 2024

(54) VEHICLE INTERIOR LIGHTING DEVICE

(71) Applicants: TOYOTA JIDOSHA KABUSHIKI KAISHA, Aichi-ken (JP); TOYODA GOSEI CO., LTD., Aichi-ken (JP)

(72) Inventors: Masahiro Fujita, Toyota (JP); Shunsuke Kurebayashi, Toyota (JP); Shizuo Sanjo, Toyota (JP); Masato Takeuchi, Kiyosu (JP); Shunya Nishimura, Aichi-ken (JP); Ayaka Yagi, Kiyosu (JP)

(73) Assignees: TOYOTA JIDOSHA KABUSHIKI KAISHA, Aichi-ken (JP); TOYODA GOSEI CO., LTD., Aichi-ken (JP)

(*) Notice: Subject to any disclaimer, the term of this patent is extended or adjusted under 35 U.S.C. 154(b) by 0 days.

(21) Appl. No.: 18/302,795

(22) Filed: Apr. 19, 2023

(65) Prior Publication Data
US 2023/0339390 A1 Oct. 26, 2023

(30) Foreign Application Priority Data
Apr. 20, 2022 (JP) .................................. 2022-069180

(51) Int. Cl.
*B60Q 3/217* (2017.01)
*B60Q 3/60* (2017.01)
*B60Q 3/80* (2017.01)

(52) U.S. Cl.
CPC ............... *B60Q 3/217* (2017.02); *B60Q 3/60* (2017.02); *B60Q 3/80* (2017.02)

(58) Field of Classification Search
CPC ............. B60Q 3/217; B60Q 3/60; B60Q 3/80
See application file for complete search history.

(56) References Cited

U.S. PATENT DOCUMENTS

| | | | |
|---|---|---|---|
| 11,531,252 B2* | 12/2022 | Suto .................... | B60Q 3/14 |
| 2007/0177397 A1* | 8/2007 | Sakakibara ............. | B60Q 3/64 |
| | | | 362/326 |
| 2010/0296304 A1* | 11/2010 | Hayes ................... | B60Q 3/225 |
| | | | 362/543 |
| 2016/0185387 A1* | 6/2016 | Kuoch .................. | B60K 35/00 |
| | | | 701/41 |
| 2023/0141871 A1* | 5/2023 | Takeuchi ............... | B60Q 3/80 |
| | | | 428/195.1 |

FOREIGN PATENT DOCUMENTS

JP          6755246 B2     9/2020

* cited by examiner

*Primary Examiner* — Thomas M Sember
(74) *Attorney, Agent, or Firm* — HAUPTMAN HAM, LLP

(57) ABSTRACT

A vehicle interior lighting device includes a light source which is installed at an end of an instrument panel of a vehicle. Light emitted from the light source propagates from the instrument panel toward a door panel, and is projected on a surface of a door trim of the door panel. A decorative pattern element is installed on a light emitting side of the light source. As light from the light source passes through the decorative pattern element, the light can create a pattern on a surface of the door trim. Because the light source is installed on the instrument panel spaced from the door trim rather than on the door trim itself, light can be projected on a large area of the door trim. Furthermore, an impressive feature of a decorative pattern which changes in accordance with a door opening angle can be achieved.

3 Claims, 5 Drawing Sheets

VEHICLE INTERIOR LIGHTING DEVICE

CROSS REFERENCE TO RELATED APPLICATION

This application claims priority to Japanese Patent Application No. 2022-069180 filed on Apr. 20, 2022, which is incorporated herein by reference in its entirety including the specification, claims, drawings, and abstract.

TECHNICAL FIELD

The present disclosure relates to a vehicle interior lighting device mounted in a vehicle to emit light to a door panel.

BACKGROUND

Lighting devices which emit light to a door trim of a door panel are known.

JP 6755246B discloses a lighting device with a light source installed on a door trim to project light to a decorative element on the door trim.

In the lighting device disclosed in JP 6755246B, because the light source is installed on the door trim itself, the distance from the light source to the decorative element on the door trim is short. It is thus not possible to project light over a decorative element of large area.

An object of the present disclosure is to provide a lighting device which can project light on to a larger area of a door trim than with a light source installed on the door trim itself.

SUMMARY

A vehicle interior lighting device according to an aspect of the present disclosure includes a light source installed on an instrument panel of a vehicle. The light source is configured to project light from the instrument panel to a door trim of a door panel.

With this configuration, because the light source is installed on the instrument panel, the distance between the light source and the door trim is longer than that of light source installed on the door trim itself. This makes it possible to project light over a larger area of the door trim.

The vehicle interior lighting device may further include a decorative pattern element installed on a light emitting side of the light source such that a pattern is created on a surface of the door trim by projecting light from the light source to the surface of the door trim.

With this configuration, because the light source and the door trim to which light is projected are separated from each other, the light projection angle to the door trim changes in accordance with the opening and closing of the door. The pattern created with light on the surface of the door trim thus changes in accordance with the opening angle of the door. The pattern may be continuously changed by continuously opening or closing the door.

When the door to which the door trim is installed remains open while the light source is illuminated, the light source may be turned off when a predetermined time period has elapsed after the door has been opened.

With this configuration, continuous projection of light outside the vehicle when the door is opened can be prevented.

BRIEF DESCRIPTION OF DRAWINGS

Embodiments of the present disclosure will be described based on the following figures, wherein.

DESCRIPTION OF EMBODIMENTS

Figure 1:
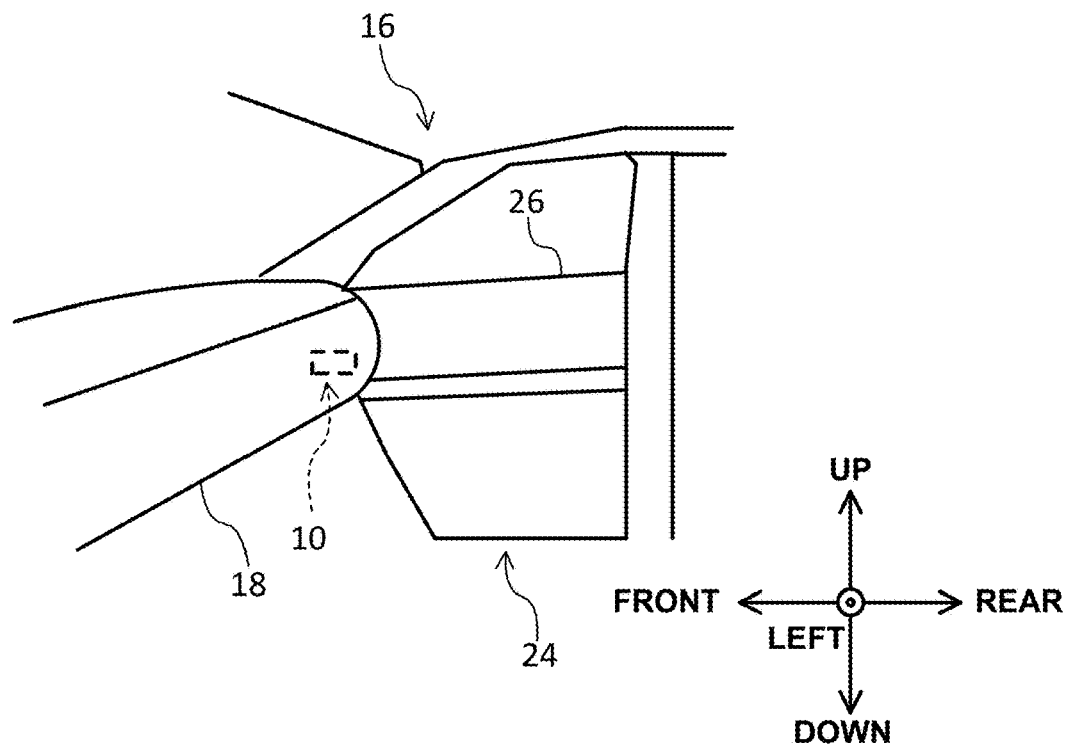
FIG. 1 shows a front interior of a vehicle viewed from the left of the vehicle.
Figure 2:
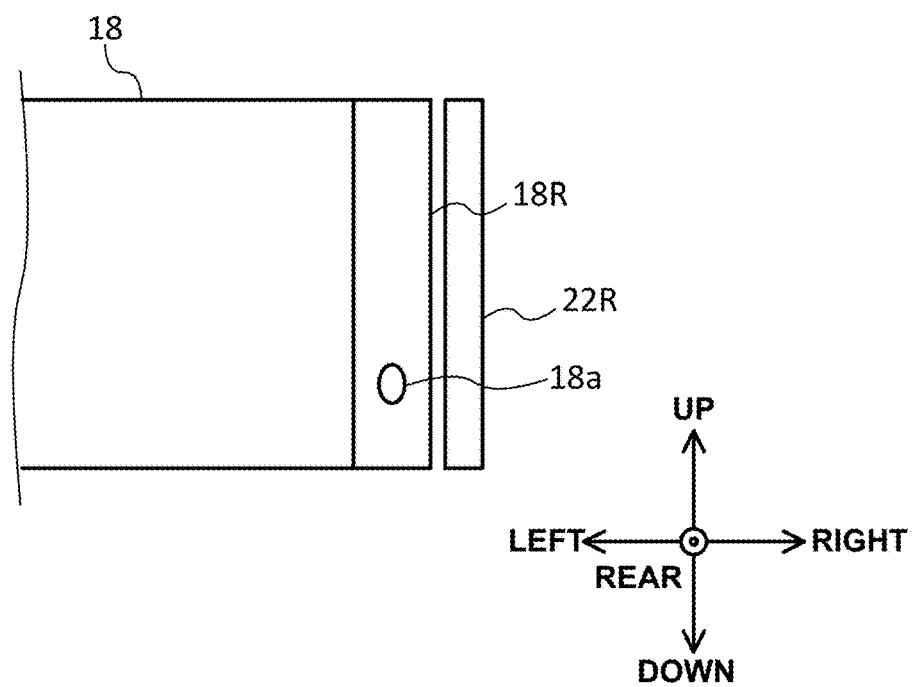
FIG. 2 is an elevational view of a right portion of an instrument panel viewed from the rear of the vehicle.
Figure 3:
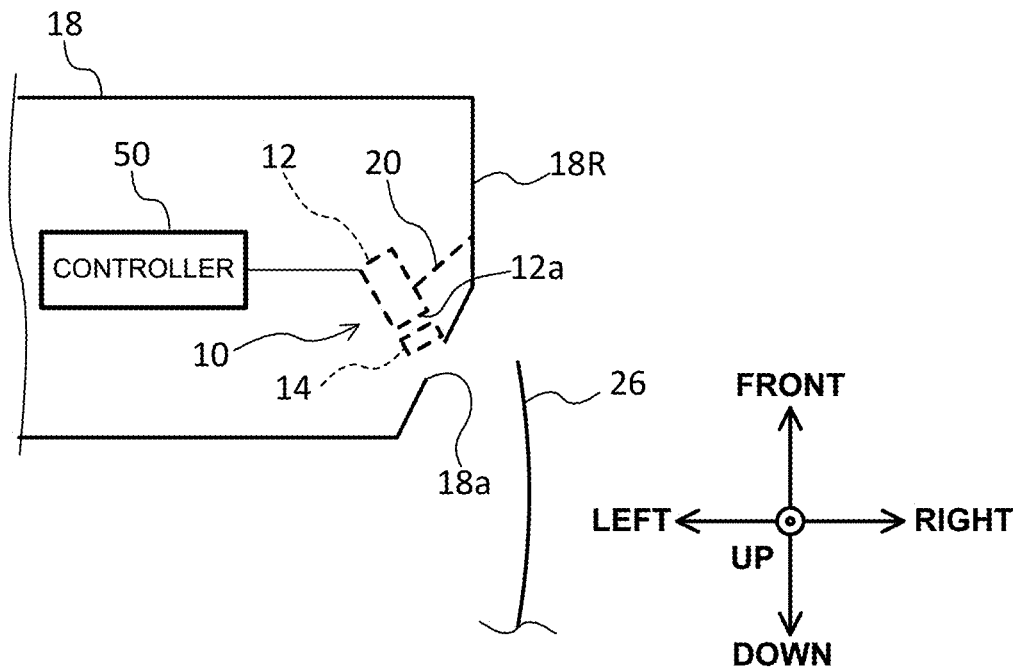
FIG. 3 is a plan view of the right portion of the instrument panel viewed from above the vehicle.
Figure 4:
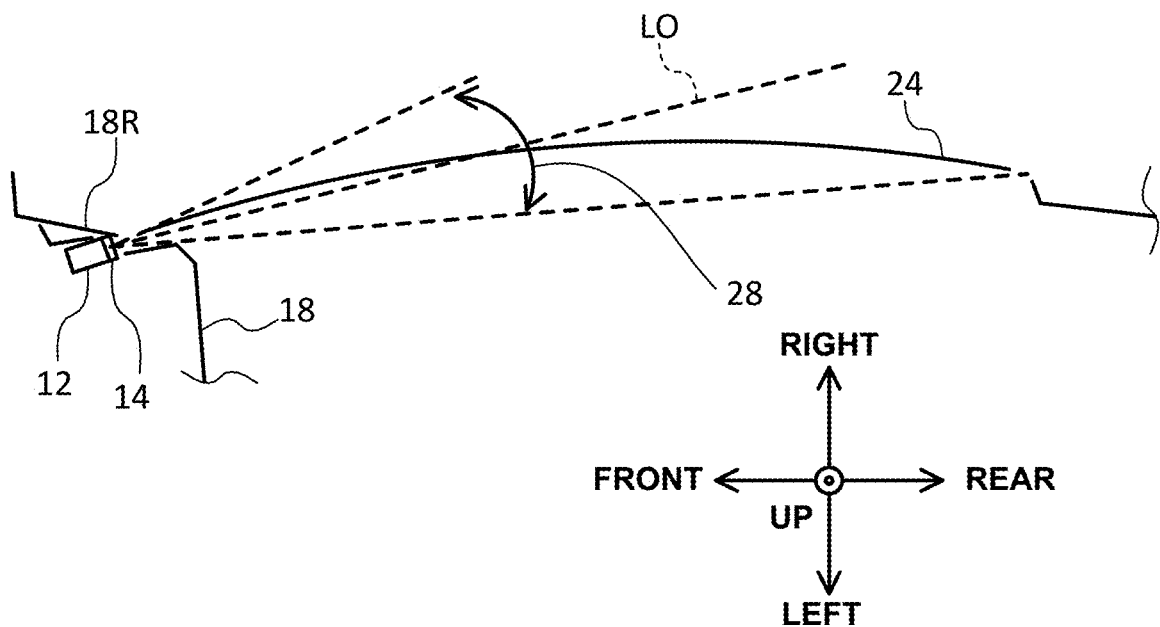
FIG. 4 is a plan view of a door panel and a light source viewed from above the vehicle, showing a light projection range to a door panel.

Vehicle interior lighting devices according to embodiments of the present disclosure are described below with reference to FIGS. 1 to 4. FIG. 1 shows a front interior of a vehicle viewed from the left of the vehicle. FIG. 2 is an elevational view of a right portion of an instrument panel 18 viewed from the rear of the vehicle. FIG. 3 is a plan view of the right portion of the instrument panel 18 viewed from above the vehicle. FIG. 4 is a plan view of a door panel 24 and a light source 12 viewed from above the vehicle. FIGS. 2 to 4 schematically show positional relationships between the instrument panel 18 and the door panel 24.

A vehicle interior lighting device 10 includes the light source 12 and a decorative pattern element 14. The vehicle interior lighting device 10 is installed on the instrument panel 18 which is located at the front of a vehicle 16. For example, the instrument panel 18 may extend in a lateral direction of the vehicle 16 (vehicle width direction) at the front of the vehicle 16, and two vehicle interior lighting devices 10 may be provided, respectively at the right and left ends of the instrument panel 18.

FIGS. 1 to 4 show the vehicle interior lighting device 10 disposed at a right end 18R of the instrument panel 18. The light source 12 may be installed at the right end 18R with a bracket 20, or other means. Although not shown, the vehicle interior lighting device 10 may also be installed at a left end of the instrument panel 18. The vehicle interior lighting device 10 may be installed between the right end 18R of the instrument panel 18 and a side panel 22R of the vehicle 16. This configuration is also applicable to the vehicle interior lighting device 10 at the left end.

An opening 18a may be formed at the right end 18R of the instrument panel 18 such that the opening 18a faces a door trim 26. The door trim 26 is an interior component of the door panel 24 at the right of the vehicle. The light source 12 may be disposed at the right end 18R such that a light emitting surface 12a of the light source 12 faces the opening 18a. The decorative pattern element 14 may be disposed in front of the light emitting surface 12a of the light source 12. Light from the light source 12 may be emitted through the opening 18a via the decorative pattern element 14 and directed rearward and rightward of the vehicle. The position and the orientation of the opening 18a may be adjusted such that light emitted from the light source 12 is projected to the door panel 24. Light emitted from the light source 12 is thus projected on the door trim 26 attached to the door panel 24. Similarly, light emitted from the light source installed at the left end of the instrument panel 18 may be projected to a door trim attached to a door panel at the left of the vehicle.

A light emitting diode (LED), an incandescent light bulb, a halogen bulb, a fluorescent lamp, or a discharge lamp may be used for the light source 12, but the light source 12 is not limited to lights of these types. Further, various luminous colors of the light source 12, for example, white, red, green, or blue, may be used. The light source 12 may be configured with multiple light sources which illuminate different colors.

The light source 12 may be electrically connected to a controller 50, which controls switching on and off of the light source 12. The controller 50 may include, for example, a processor, such as a central processing unit (CPU), and a storage device, such as a memory and a hard disk drive. The controller 50 may further control brightness and blinking of light emitted from the light source 12.

The decorative pattern element 14 may be used to create a pattern with light projected from the light source 12. For example, the decorative pattern element 14 may be an element having a surface with holes and bumps, or areas of different roughness or transmittance, alone or in any combination. The decorative pattern element 14 may be a film attached to the light emitting surface 12a. As light from the light source 12 passes through the decorative pattern element 14, light can create a pattern on the surface of the door trim 26.

As light emitted from the light source 12 spreads radially while propagating, the area covered by the light increases with distance. In other words, the greater the distance from the light source 12, the larger the area covered by light. Because the light source 12 is not installed on the door trim 26 itself, but is installed on the instrument panel 18 that is spaced apart from the door trim 26, the surface area of the door trim 26 covered by light can be larger than with a light source 12 installed on the door trim 26 itself.

FIG. 4 depicts a projection range of light from the light source 12. FIG. 4 shows the door panel 24 but not the door trim 26. An optical axis LO shows an optical axis of light emitted from the light source 12. A projection range 28 is the range of light projected from the light source 12. Light emitted from the light source 12 is projected rearward from the front end of the door trim 26 which is installed on the door panel 24. Light also spreads in a vertical direction of the vehicle 16 (vehicle height direction) and is projected on the door trim 26 such that light is projected across the door trim 26 between the lower edge and the upper edge.

Figure 5:
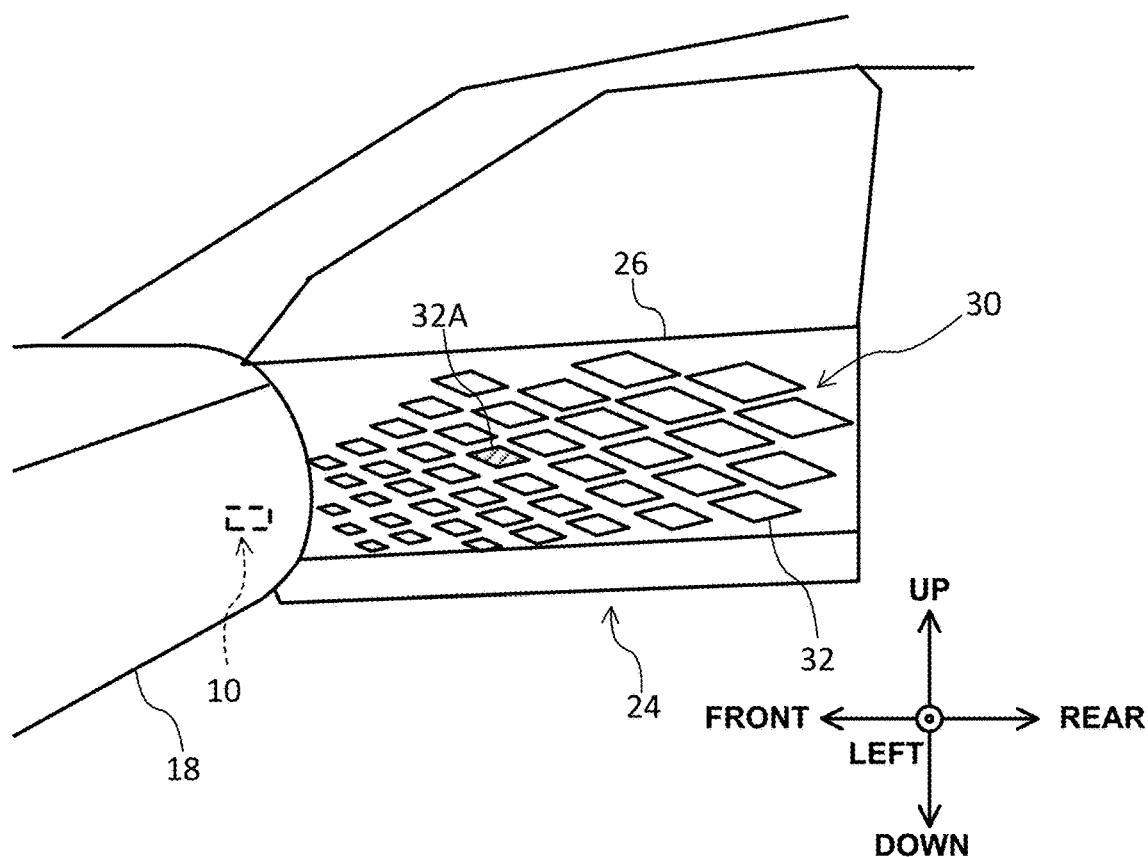
FIG. 5 shows a pattern created with light projected to the door panel.

FIG. 5 shows a pattern 30 projected with light on the door trim 26. The pattern 30 is created by light which has passed through the decorative pattern element 14 before being projected on a surface of the door trim 26. For example, the pattern 30 may include illuminated bright motifs 32 and dark portions around respective bright motifs 32. The decorative pattern element 14 may create difference in brightness, creating the bright motifs 32 and the dark portions.

In the example shown in FIG. 5, each of the bright motifs 32 has a rhombus shape. Although the bright motifs 32 are regularly arranged, the arrangement and the shape of each bright motif 32 are merely given as examples. The pattern 30 varies in accordance with the decorative pattern design of the decorative pattern element 14.

As light is projected on the surface of the door trim 26 from the instrument panel 18 in an oblique direction, the shape of each bright motif 32 becomes more elongated in the vertical and longitudinal directions of the vehicle with the increase in distance from the instrument panel 18. This causes the pattern 30 to be a directional design directed in the vertical and longitudinal directions of the vehicle.

The light source 12 is installed on the instrument panel 18, which is not the door panel 24 to which light is projected. As the projection position and the projection angle of light projected to the door trim 26 continuously change in accordance with the opening angle of the door, the pattern 30 changes accordingly.

The changes of the pattern 30 in accordance with the opening and closing of the door are described below.

Figure 6:
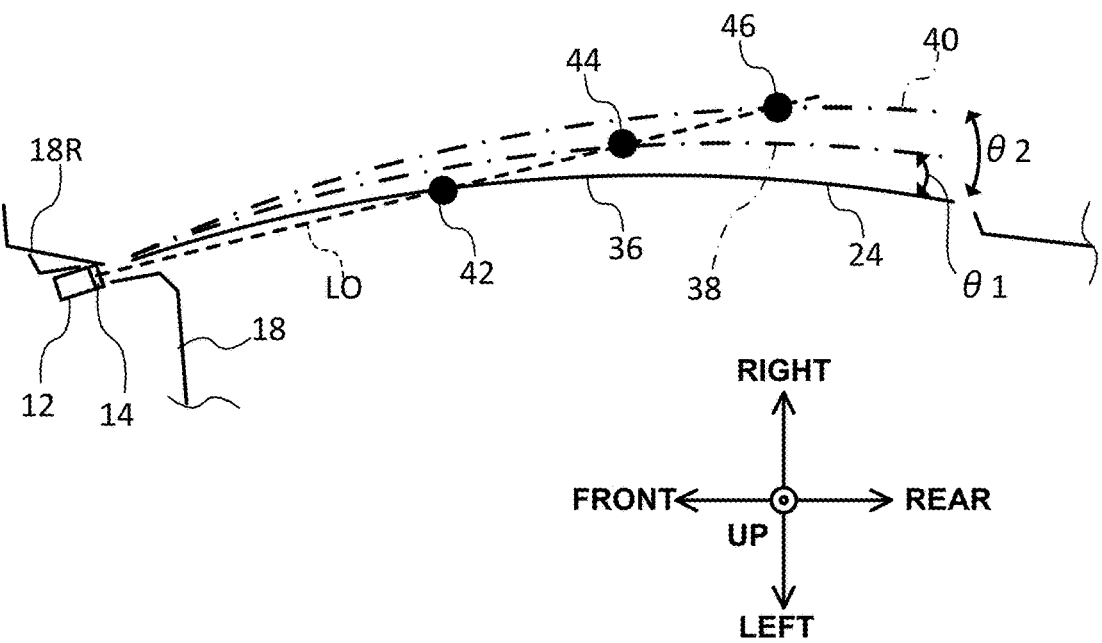
FIG. 6 is a plan view of the door panel and the light source viewed from above the vehicle, showing light projection positions for different door opening angles.

FIG. 6 shows the projection positions of light for different door opening angles. FIG. 6 is a plan view of the door panel 24 and the light source 12, viewed from above the vehicle. It should be noted that FIG. 6 shows the door panel 24 but not the door trim 26.

Reference numeral 36 denotes the door panel 24 when the door is closed. The opening angle of the door panel 24 denoted by reference numeral 36 is 0°. Reference numeral 38 denotes the door panel 24 at the door opening angle θ1 with respect to the 0° opening angle. Reference numeral 40 denotes the door panel 24 at the door opening angle θ2 (>θ1) with respect to the 0° opening angle.

Changes in the light projection positions in accordance with the opening and closing of the door are described with reference to the optical axis LO. Projection positions 42, 44, 46 are projection positions of the optical axis LO on the door panel 24. The projection position 42 is the projection position of the optical axis LO when the door is closed. The projection position 44 is the projection position of the optical axis LO when the opening angle of the door is θ1. The projection position 46 is the projection position of the optical axis LO when the opening angle of the door is θ2.

As light is projected on the door panel 24 rearward from a front portion of the vehicle, the projection position of the optical axis LO moves rearward as the opening angle of the door increases. In other words, as the door is opened, the projection position of the optical axis LO moves rearward. In the example shown in FIG. 6, the projection position of the optical axis LO moves from the projection position 42 to the projection position 44, and then to the projection position 46. The projection position of light around the optical axis LO also changes in accordance with the opening angle of the door.

Figure 7:
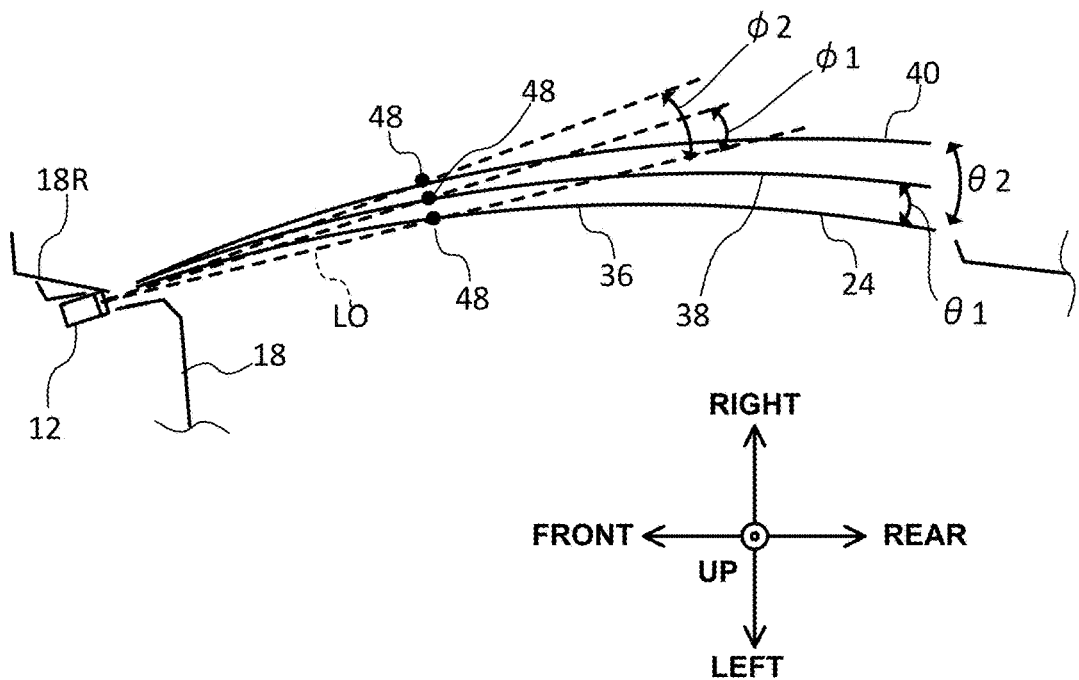
FIG. 7 is a plan view of the door panel and the light source viewed from above the vehicle, showing light projection angles for different door opening angles.

FIG. 7 shows the projection angle of light at a certain position 48 on the door panel 24. The projection angle of light at the position 48 changes in accordance with the door opening angle. Using the optical axis LO as the reference, the projection angle at the position 48 becomes larger with a larger opening angle of the door. For example, the projection angle at the position 48 is φ1 when the door opening angle is θ1, whereas the projection angle at the position 48 is φ2 (>φ1) when the door opening angle is θ2. The light projection angle changes in accordance with the door opening angle at positions other than the position 48.

Figure 8:
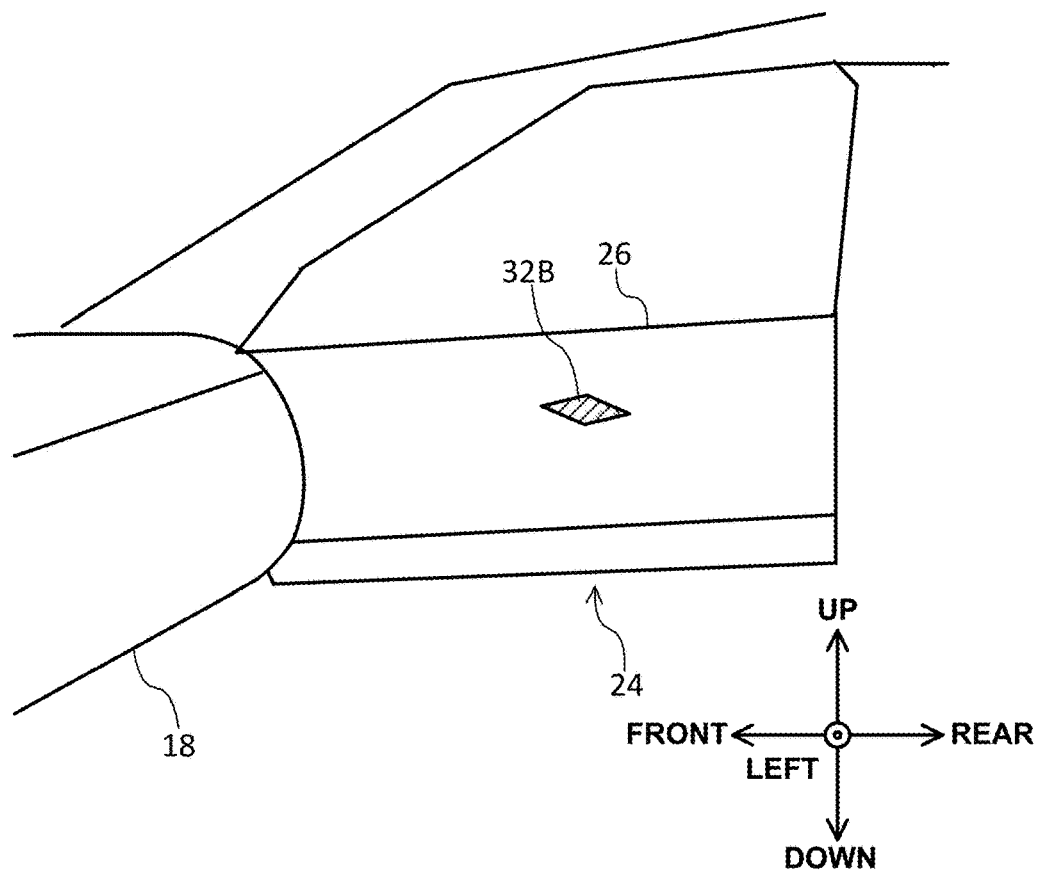
FIG. 8 shows one motif of the pattern created on the door panel when the door opening angle is θ1.
Figure 9:
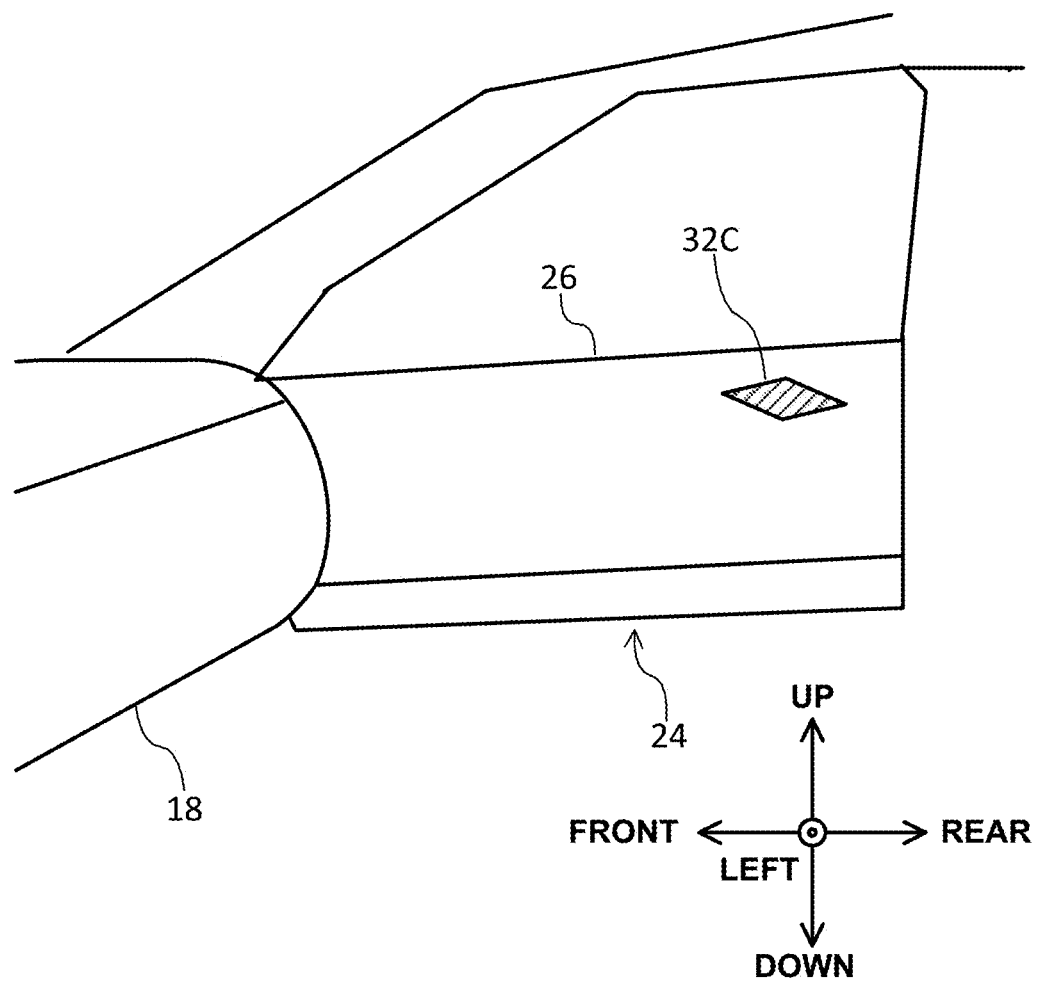
FIG. 9 shows the motif of the pattern created on the door panel when the door opening angle is θ2.

With reference to FIGS. 5, 8, and 9, changes of the pattern 30 are described. FIG. 8 shows one of motifs of the pattern 30 when the door opening angle is θ1. FIG. 9 shows the same motif of the pattern 30 when the door opening angle is θ2. For convenience of description, one bright motif 32 is focused on to describe changes of the pattern 30. The other bright motifs 32 are omitted in the drawings.

The bright motif 32 created on the optical axis LO at different positions are referred to as bright motifs 32A, 32B, 32C. The bright motif 32A shown in FIG. 5 is created at the projection position 42 when the door opening angle is 0°. The bright motif 32B shown in FIG. 8 is created at the projection position 44 when the door opening angle is θ1. The bright motif 32C shown in FIG. 9 is created at the projection position 46 when the door opening angle is θ2.

The bright motif 32B is created at a position rearer of the vehicle 16 than the bright motif 32A. The bright motif 32B is larger than the bright motif 32A. The vertical and horizontal lengths of the bright motif 32B may be longer than those of the bright motif 32A.

Similarly, the bright motif 32C is created at a position rearer of the vehicle 16 than the bright motif 32B. The bright motif 32C is larger than the bright motif 32B. The vertical and horizontal lengths of the bright motif 32C may be longer than those of the bright motif 32B.

As described above, the bright motif on the same optical axis LO moves along the surface of the door trim 26 towards the rear of the vehicle 16 as the door opening angle increases. This gives an occupant of the vehicle 16 an impression that the bright motif moves rearward of the vehicle 16 as the door is opened. The occupant may also have an impression that the bright motif becomes larger. The other bright motifs give similar impressions.

In contrast, the bright motif created on the same optical axis LO moves more forward of the vehicle 16 on the door trim 26 as the door opening angle decreases. This gives an occupant of the vehicle 16 an impression that the bright motif moves forward of the vehicle 16 during closing of the door. The occupant may also have an impression that the bright motif becomes smaller.

As shown in FIG. 7, because the projection angle at the same position changes in accordance with the door opening angle, the pattern created with light projected at the same position changes accordingly.

As described above, because the respective motifs of the pattern 30 appear to move while changing their shapes in accordance with the door opening angle, the pattern 30 itself appears to be changing to the occupant. A continuous opening or closing of the door causes a continuous change of the pattern 30. As such, the vehicle interior lighting device 10 according to an embodiment of the present disclosure can change the pattern created with light projected on the door trim with only the single light source 12.

The controller 50 may turn on the light source 12 when the vehicle 16 is started (for example, when the motor or the engine is started), and turn off the light source 12 when the vehicle 16 is stopped (for example, when the motor or the engine is stopped). In other words, the controller 50 may maintain illumination of the light source 12 continuously during the period between the starting and stopping of the vehicle 16. In another example, the controller 50 may turn on or off the light source 12 in accordance with on/off instructions from an occupant. For example, the controller 50 may turn on the light source 12 when the vehicle 16 is started, and then turn off the light source 12 in accordance with an off instruction from an occupant.

When the door is opened while the light source 12 is on, the controller 50 may turn off the light source 12 when a predetermined time period has elapsed after the door has been opened. In other words, the controller 50 may turn off the light source 12 when the door is held open for a time period exceeding a predetermined duration. Because the light source 12 is installed at an end of the instrument panel 18, when the door is open, light from the light source 12 propagates outside the vehicle 16 through the space made by the opened door, and may be projected on a pedestrian outside the vehicle 16, another vehicle, or the like. By turning off the light source 12 when the door is opened, projection of light from the light source 12 to pedestrians or the like outside the vehicle 16 can be prevented. When the door is opened, the controller 50 may extinguish the light by gradually diminishing its brightness.

When the door is opened, the controller 50 may change the color of light emitted from the light source 12. For example, the controller 50 may cause the light source 12 to emit white light while the door is closed, and red light while the door is opened. This can help the occupant recognize when the door is open.

The invention claimed is:

1. A vehicle interior lighting device comprising:
    a light source installed on an instrument panel of a vehicle, the light source configured to project light from the instrument panel to a door trim of a door panel; and
    a pattern element installed on a light emitting side of the light source, wherein
    the light source is configured to project the light, through the pattern element, to a surface of the door trim with an optical axis angled with respect to the door trim to create a pattern on the surface of the door trim wherein the pattern changes in accordance with an opening and closing of a door to which the door panel is installed.

2. The vehicle interior lighting device according to claim 1, wherein
    the light source is configured to, in response to (i) the door to which the door panel is installed being opened while the light source illuminates and (ii) a predetermined time period elapses after the door has been opened, be turned off.

3. The vehicle interior lighting device according to claim 1, wherein
    the light source is configured to,
        in response to the door being opened, project the light in a first color, and
        in response to the door being closed, project the light in a second color different from the first color.

\* \* \* \* \*